United States Patent
Policicchio

(10) Patent No.: US 6,315,276 B1
(45) Date of Patent: Nov. 13, 2001

(54) SPRING SEATING SUPPORT SYSTEM

(76) Inventor: Bruno Policicchio, 5504 Lakefront Dr., Tupele, MS (US) 38801

( * ) Notice: Subject to any disclaimer, the term of this patent is extended or adjusted under 35 U.S.C. 154(b) by 0 days.

(21) Appl. No.: 09/348,733

(22) Filed: Jul. 6, 1999

Related U.S. Application Data

(60) Provisional application No. 60/091,743, filed on Jul. 6, 1998.

(51) Int. Cl.[7] .................................. F16F 1/00; A47C 7/14
(52) U.S. Cl. ..................................... 267/131; 267/142; 5/7
(58) Field of Search .................................. 267/131, 142; 5/1, 2.1, 7, 936

(56) References Cited

U.S. PATENT DOCUMENTS

| | | | | |
|---|---|---|---|---|
| 3,729,753 | * | 5/1973 | Johnson | 5/2 R |
| 3,953,903 | * | 5/1976 | Lawrence | 5/267 |
| 3,990,121 | * | 11/1976 | Whitaker | 5/260 |
| 4,160,544 | * | 7/1979 | Higgins | 267/166 |
| 4,310,959 | * | 1/1982 | Wandeloski | 29/91.1 |
| 4,573,741 | * | 3/1986 | Kirchner-Carl | 297/452 |
| 5,655,240 | * | 8/1997 | Miller | 5/717 |

* cited by examiner

Primary Examiner—J. J. Swann
Assistant Examiner—David Divine
(74) Attorney, Agent, or Firm—Phelps Dunbar, L.L.P.

(57) ABSTRACT

A spring seating support system with a hard front edge that is pivotally connected to an upper support wire grid. The wire grid consists of latitudinal wires which contact and hold in place the uppermost portion of rows of coil springs, and longitudinal wires which are rigidly connected to the latitudinal wires, and which provide support for padding and upholstery. The bottom most portion of the coil springs are attached to a lower support unit, which is rigidly connected to the bottom of the hard front edge.

3 Claims, 1 Drawing Sheet

SPRING SEATING SUPPORT SYSTEM

This application claims benefit of Provisional Application Ser. No. 60/091,743 filed Jul. 6, 1998.

BACKGROUND OF THE INVENTION

This invention generally relates to improvements in a spring seating support system for upholstered furniture. This invention is particularly well suited for use as a spring seating support system in sofas, love seats, chairs, and similar furniture. Although the present invention is in no sense limited to upholstered furniture, the herein illustrated forms which the present invention may take are particularly adapted for use in upholstered furniture. For this reason, the objects and advantages hereinafter disclosed will have specific reference to upholstered furniture, but such objects and advantages are intended to extend to other types of construction wherein any one of the desired characteristics of the spring seating support system would be advantageous.

Conventional box springs for upholstered furniture are comprised of a lower wooden or wire support frame and an upper support system. Between the upper support system and the lower support frame there are a plurality of coil springs which are generally helical or cylindrical coil springs. To insure that the axis of each of the coil springs remains vertical, each spring must be secured to both the upper support system and to the lower support frame.

Coil springs are typically aligned in successive rows in such a fashion that the coil springs are substantially aligned with corresponding coil springs in the adjacent row. Thus, the coil springs are aligned in spaced columns and rows. Presently, there is no standard in the industry regarding the spacing of the coil springs in rows or columns.

The edge of a conventional box spring unit is flexible because the padding and upholstery are directly covering the coil springs, which are flexible. The flexibility of the edge of a conventional box spring, however, complicates the manufacturing process at the stage when the padding and upholstery are applied because it is difficult to securely fasten the padding and upholstery to a nonrigid surface. In addition, the movement of the flexible coil springs when they are compressed under weight or pressure acts to loosen the padding and upholstery over time and thereby to reduce the effective life of the conventional box spring unit.

A conventional hard edge spring seating unit does not have these concerns. Conventional hard edge springs seating units have a hard front edge which allows for padding and upholstery to be attached in a secure manner. Conventional hard edge seating units, however, use sinuous springs to support the weight or pressure applied to the top of the unit. Sinuous springs do not provide as comfortable a level of support as do coil springs because each sinuous springs is sensitive to the movement of the other sinuous springs, and interference between sinuous springs leads to unsteady distribution of the weight or pressure.

The spring seating support system which is the subject of this invention provides the comfortable support of coil springs with the durability and ease of manufacture associated with a hard edge. It uses a flexible wire grid to link the coil springs and the hard front edge. This allows the coil springs to compress under weight or pressure while they are joined to the rigid hard front edge without damaging the connecting wire grid. The wire grid is able to pivot at the attachment point with the hard front edge, so that it can properly keep the coil springs aligned along the vertical axis while maintaining contact with the hard front edge so that the padding and upholstery are able to lie flat. In this way, the spring seating support system which is the subject of this invention provides the benefits of a hard front edge to which padding and upholstery can easily and durably be attached during the manufacturing of the unit and of a coil spring support system which allows for comfortable support of weight or pressure.

SUMMARY OF THE INVENTION

The present invention achieves its objectives by installing a wire grid linking the coil springs both to each other and to the hard front edge, said grid being secured to the coil springs by clips insulated to reduce noise generation during compression and being secured to the hard front edge by staples.

The spring seating support system is made up of two or more rows of coil springs between a lower support frame and a wire grid. A border wire runs along and is attached, preferably by insulated clips, to the outside edge of the upper most portion of one row of coil springs, said row being an external row. The border wire also connects, preferably by insulated clips, the one or more remaining rows of coil springs to the external row and to each other along the outside edge of the uppermost portion of the outside coil springs in those remaining rows, framing the rows of coil springs on three sides. The wire grid, which is attached to the tops of the coil springs is composed of two latitudinal perimeter wires, a plurality of flexible longitudinal perpendicular support wires, and two latitudinal interior wires for each row of coil springs beyond the external or back row of coil springs. Every coil spring in the back row is connected to the border wire. One of the latitudinal perimeter wires attaches to the upper most portion of the coil springs in the back row of coil springs on the opposite side of the springs from the border wire. The back row of coil springs is now located between the border wire and one of the latitudinal perimeter wires. The hard front edge is generally perpendicularly attached to the lower support frame on the side opposite from where the back row of coil springs is attached. The second latitudinal perimeter wire attaches to the top of the hard front edge of the spring seating support system, parallel to the first latitudinal perimeter wire. For each row of coil springs other than the back row, two latitudinal interior wires attach, one on each side, to every coil in the row at the uppermost portion so that they are parallel to the two latitudinal perimeter wires. Thus, each row of coil springs other than the back row will be located between two latitudinal interior wires running parallel to the two latitudinal perimeter wires. Neither the latitudinal perimeter wires nor the latitudinal interior wires contact the border wire. A series of flexible longitudinal wires attaches to the latitudinal perimeter wires and the latitudinal interior wires. The longitudinal wires should be spaced closely enough that the padding will not penetrate or infiltrate the area of the coil springs. This forms a wire grid connected to the tops of the coil springs and to the top of the hard front edge.

The advantages of this spring seating support system comprising a wire grid atop rows of coil springs which attaches to a hard front edge are substantial. It allows the use of coil springs, which provide more comfortable support than sinuous springs, with a hard front edge. This simplifies the manufacturing process by allowing the padding and upholstery to be attached to a large rigid surface rather than attaching to several flexible coil springs. The attachment of the padding and upholstery is also more secure due to the rigid nature of the hard front edge. The points of attachment are not flexed as much as when they were attached directly to coil springs, reducing the wear on the attachment points so that the padding and upholstery remain fixed to the spring seating support system for a longer period of time. Essentially, the invention provides a comfortable sitting surface which is also durable and easy to manufacture.

It is an object of this invention to provide a spring seating support system in which the individual coil springs are connected to each other and to a hard front edge in a manner which deters displacement of the coil springs from the vertical axis while remaining attached to the hard front edge.

It is still another object of this invention to distribute the load across the coil springs.

It is yet another object of this invention to provide a wire grid support system in which the wire grid is durable, flexible and sturdy.

It is yet another object of this invention to provide a wire grid support system which reduces compression noise.

It is yet another object of this invention to provide a wire grid support system in which the wire grid provides a relatively flat surface on which the padding can be placed in order to minimize or reduce uneven distribution of padding.

It is yet another object of this invention to provide a wire grid support system in which the wire grid blocks penetration or infiltration of the padding into the area occupied by the coil springs.

It is yet another object of this invention to provide a wire grid support system, the production of which is not labor intensive.

It is yet another object of this invention to provide a hard front edge for the attachment of padding and upholstery in a secure manner which is not labor intensive.

These and other objects of the present invention will be more apparent to those skilled in the art from the following detailed description of the invention.

BRIEF DESCRIPTION OF THE DRAWING

Reference will be made to the drawing wherein like parts are designated by like numerals and wherein.

DETAILED DESCRIPTION OF THE PREFERRED EMBODIMENT

Figure 1:
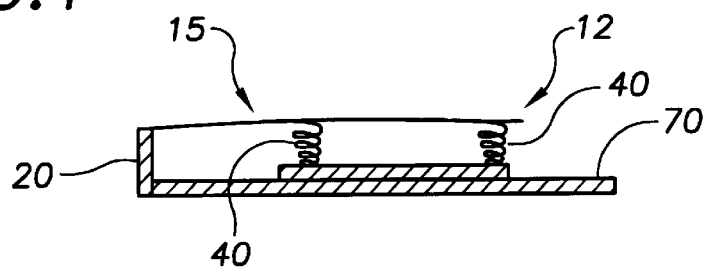
FIG. 1 is a side view of the spring seating support system.
Figure 2:
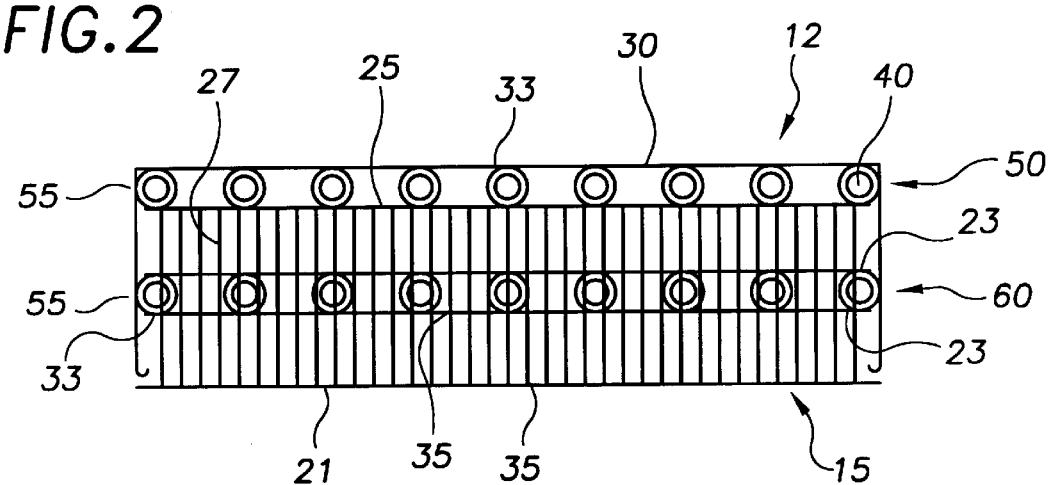
FIG. 2 is a plan/top view of the spring portion of the spring seating support system.
Figure 3:
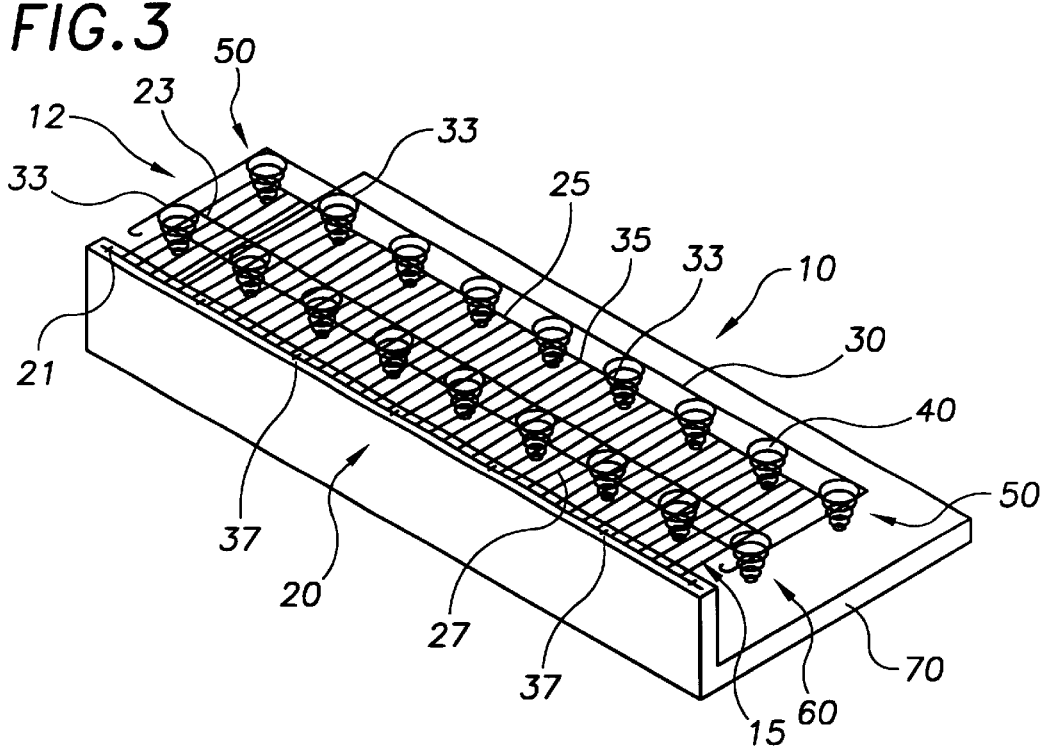
FIG. 3 is a perspective view of the spring seating support system.

Referring now to the drawings in more detail, the preferred embodiment of the spring seating support system is generally designated by the numeral 10.

The spring seating support system 10 is comprised of an upper support frame 12 and a lower support frame 70 located in generally parallel planes spaced apart by a plurality of coil springs 40 and a hard front edge 20 which is generally perpendicular to the planes of the upper support frame 12 and the lower support frame 70. The hard front edge 20 is attached to the lower support frame by means of a fastening device, such as nails, staples, screws, glue, or other similar means. The hard front edge may be comprised of any rigid material, but will usually be manufactured from wood. The upper support frame 12 is comprised of a heavy gauge border wire 30 and a wire grid comprised of a front latitudinal perimeter wire 21 in parallel with a back latitudinal perimeter wire 25, 2 or more latitudinal interior wires 23, a plurality of flexible longitudinal support wires 27 generally perpendicular to the front latitudinal perimeter wire 21 and the back latitudinal perimeter wire 25, a plurality of insulated clips 33, a plurality of wire connections 35, and a plurality of anchor point connections 37.

A plurality of coil springs 40 are spaced in a series of latitudinal rows 55. The coil springs in each latitudinal row 55 may, but generally do not, touch each other. A space of the from ¼th to 3 inches, and preferably approximately one inch separates the coil springs 40 in each latitudinal row 55. The coil springs 40 form two or more latitudinal rows 55. A typical seat arrangement will have two latitudinal rows 55 of coil springs 40. The latitudinal rows 55 of coil springs 40 do not touch each other. A space of from two to ten inches, and preferably approximately four inches, separates the latitudinal rows 55 from each other. Each coil spring 40 is mounted to the lower support frame 70 at the bottom of each coil spring 40.

The external side of the uppermost loop of each coil spring 40 in the back row of coil springs 50 is attached to a heavy gauge border wire 30 by an insulated clip 33. The insulated clip 33 securely fastens the coil springs 40 in the back row 50 to the heavy gauge border wire 30. The insulated clip 33 is insulated such that when the coil springs 40 are compressed during use there will be no compression noise caused by the connection between the coil springs 40 in the back row 50 and the heavy gauge border wire 30. The heavy gauge border wire 30 also attaches to the uppermost loop of the coil springs 40 located at either end of the interior latitudinal coil rows 60 by an insulated clip 33. The insulated clip 33 securely fastens the coil springs 40 at the ends of the interior latitudinal coil rows 60 to the heavy gauge border wire 30. The insulated clip 33 is insulated such that when the coil springs 40 are compressed during use there will be no compression noise caused by the connection between the coil springs 40 on the ends of the interior latitudinal rows 60 and the heavy gauge border wire 30.

The wire grid 15 has a number of latitudinal interior wires 23 determined by the number of interior latitudinal rows of coil springs 60. For each interior latitudinal row of coil springs 60 there are two latitudinal interior wires 23. The latitudinal interior wires 23 are attached on both sides of the uppermost loop of each coil spring 40 in each interior latitudinal row of coil springs 60 parallel to the hard front edge 20 by insulated clips 33. The insulated clips 33 securely fasten the latitudinal interior wires 23 to the interior latitudinal rows of coil springs 60. The insulated clip 33 is insulated such that when the coil springs 40 are compressed during use there will be no compression raise caused by the connection between the latitudinal interior wire 23 and the coil springs 40 in the interior latitudinal rows of coil springs 60.

The front latitudinal perimeter wire 21 is attached to the top of the hard front edge 20 by several anchor point connectors 37. The connectors 37 may be staples or other similar devices, and should allow for the pivoting of the front latitudinal perimeter wire 21 on the hard front edge 20. The back latitudinal perimeter wire 25 is attached with insulated clips 33 to the uppermost loop of each coil spring 40 in the back row of coil springs 50 parallel to the hard front edge 20 on the side opposite from the connection of the border wire 30 with the coil springs 40 in the back row 50 of coil springs. The insulation clips 33 securely fasten the back latitudinal perimeter wire 25 to the coil springs 40, and are insulated such that when the coil springs 40 are compressed during use there will be no compression noise caused by the connection between the coil springs 40 and the back latitudinal perimeter wire 25.

A plurality of generally parallel longitudinal support wires 27 connect the back latitudinal perimeter wire 25, the latitudinal interior wires 23, and the front latitudinal perimeter wire 21. The longitudinal support wires 27 may be placed at any number of angles relative to the back latitudinal perimeter wire 25, the latitudinal interior wires 23, and the front latitudinal perimeter wire 21, but are preferably placed at right angles to the front latitudinal perimeter wire 21, the latitudinal interior wires 23, and the back latitudinal perimeter wire 25. The number and spacing of longitudinal support wires 27 can be varied depending on the degree of rigidity desired and the support and durability desired, but must be sufficient in number and close enough together to prevent intrusion of the padding and upholstery into the space between the longitudinal support wires 27.

The longitudinal support wires 27 are rigidly connected to the front latitudinal perimeter wire 21, the latitudinal interior wires 23 and the back latitudinal perimeter wire 25. A variety of connection methods may be employed, but the preferable method is a welded connection 35. The longitudinal support wires 27 may be placed above or below the front latitudinal perimeter wire 21, the latitudinal interior wires 23, and the back latitudinal perimeter wire 25, but are preferably placed above. By welding the longitudinal support wires 27 above the front latitudinal perimeter wire 21, the latitudinal interior wires 23, and the back latitudinal perimeter wire 25, the longitudinal support wires 27 can pass over the internal rows of coil springs 60 and provide a flat surface area for the padding of the seat. The welded connections 35 between the longitudinal support wires 27 and the front latitudinal perimeter wire 21, the latitudinal interior wires 23, and the back latitudinal perimeter wire 25 are superior to flexible connections because they are more durable, and the welded connections 35 do not generate compression noise when under pressure.

The latitudinal interior wires 23 extend to a point just short of contacting the heavy gauge border wire 30. The back latitudinal perimeter wire 25 also extends to a point just short of contacting the heavy gauge border wire 30. The heavy gauge border wire 30 frames the upper support frame 12 of the spring seating support system 10 on three sides, and extends to a point just short of contacting the hard front edge 20 which borders the fourth side of the spring seating support system 10. By not making contact at these points, the wire grid 15 is able to move freely without interference, distributing the pressure to the coil springs 40 efficiently.

What I claim is:

1. A spring seating support system comprising;
   a lower support frame,
   an upper support frame, said lower support frame and said upper support frame being located in parallel planes,
   a plurality of springs located between and in connection with said lower support frame and said upper support frame, said plurality of springs having their axes oriented perpendicularly to the parallel planes in which said lower and upper support frames are located,
   a rigid front edge located between and in perpendicular contact with said lower support frame and said upper support frame on the front portion of said lower support frame and said upper support frame,
   means to flexibly connect said upper support frame to said rigid front edge,
   means to flexibly connect said upper support frame to each of said plurality of springs, and
   means to rigidly connect said rigid front edge to said lower support frame;
   wherein said upper support frame further comprises a plurality of longitudinal wires, a plurality of latitudinal wires, and means to rigidly connect said plurality of latitudinal wires to said plurality of longitudinal wires;
   wherein said springs are coil springs;
   wherein said plurality of springs are arranged in a plurality of rows, with said row of said springs farthest from said rigid front edge being a latitudinal external row, and all other of said rows of said springs being latitudinal internal rows;
   wherein said upper support frame further comprises;
   a front latitudinal perimeter wire,
   a back latitudinal perimeter wire parallel to said front latitudinal perimeter wire,
   two latitudinal interior wires for each latitudinal interior row of coil springs, said two latitudinal interior wires being parallel to said front latitudinal perimeter wire and said back latitudinal perimeter wire, and
   a plurality of longitudinal support wires generally perpendicular to said front and back latitudinal perimeter wires and said latitudinal interior wires; and
   wherein said upper support frame further comprises a border wire around the periphery of said plurality of springs on all sides except for the side of said spring seating support system containing said rigid front edge.

2. A spring seating support system as in claim 1 wherein the means to rigidly connect said front latitudinal perimeter wire, said back latitudinal wire, and said latitudinal interior wires to said plurality of longitudinal support wires is by welding.

3. A spring seating support system comprising;
   a lower support frame,
   an upper support frame comprising
   a front latitudinal perimeter wire,
   a back latitudinal perimeter wire parallel to said front latitudinal perimeter wire,
   two latitudinal interior wires for each latitudinal interior row of coil springs, said two latitudinal interior wires being parallel to said front latitudinal perimeter wire and said back latitudinal perimeter wire and located so that one of said two latitudinal interior wires contacts one side of each of said interior rows of said coil springs on the uppermost portion of said plurality of coil springs,
   a plurality of longitudinal support wires generally perpendicular to said front latitudinal perimeter wire and said back latitudinal perimeter wires and said latitudinal interior wires, and
   a border wire around the periphery of said plurality of coil springs on all sides except for the side of said spring seating support system containing said rigid front edge,
   said lower support frame and said upper support frame being located in parallel planes,
   a plurality of coil springs located between and in contact with said lower support frame and said upper support frame, said plurality of coil springs having their axes oriented perpendicularly to the parallel planes in which said lower and upper support frames are located, and wherein said plurality of coil springs are arranged in a plurality of rows, with said row of said coil springs farthest from said rigid front edge being a latitudinal external row, all other of said rows of said coil springs being latitudinal internal rows, and said latitudinal internal row of coil springs nearest to said rigid front edge being located a distance of at least the diameter of said coil springs from said rigid front edge, a rigid front edge located between and in perpendicular contact with said lower support frame and said upper support frame on the front portion of said lower support frame and said upper support fame, means to flexibly connect said upper support frame to said rigid front edge, means to flexibly connect said upper support frame to each of said plurality of coil springs, and means to rigidly connect said rigid front edge to said lower support frame.

* * * * *